US012603233B2

(12) United States Patent
Takahashi

(10) Patent No.: US 12,603,233 B2
(45) Date of Patent: Apr. 14, 2026

(54) CAPACITOR HAVING A POROUS LAYER INCLUDING A VOID CONTAINING AT LEAST PART OF A THROUGH-HOLE CONDUCTOR

(71) Applicant: Murata Manufacturing Co., Ltd., Nagaokakyo (JP)

(72) Inventor: Akitomo Takahashi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 188 days.

(21) Appl. No.: 18/410,307

(22) Filed: Jan. 11, 2024

(65) Prior Publication Data

US 2024/0186071 A1 Jun. 6, 2024

Related U.S. Application Data

(63) Continuation of application No. PCT/JP2022/022439, filed on Jun. 2, 2022.

(30) Foreign Application Priority Data

Jul. 16, 2021 (JP) ................................. 2021-117803

(51) Int. Cl.
$H01G$ $9/012$ (2006.01)
$H01G$ $9/055$ (2006.01)
(Continued)

(52) U.S. Cl.
CPC ............. *H01G 9/012* (2013.01); *H01G 9/055* (2013.01); *H01G 9/15* (2013.01); *H01G 9/26* (2013.01)

(58) Field of Classification Search
None
See application file for complete search history.

(56) References Cited

U.S. PATENT DOCUMENTS 8,822,837 B2 9/2014 Uematsu et al.
2008/0277146 A1 11/2008 Hwang et al.
(Continued)

FOREIGN PATENT DOCUMENTS

JP H08-321666 A 12/1996
JP 2003-068578 A 3/2003
(Continued)

OTHER PUBLICATIONS

Translation JP 2008098487A (no date).*
International Search Report received for PCT Patent Application No. PCT/JP2022/022439, mailed on Aug. 16, 2022, 2 pages.

*Primary Examiner* — Eric W Thomas
(74) *Attorney, Agent, or Firm* — ArentFox Schiff LLP

(57) ABSTRACT

A capacitor that includes: a capacitor layer including a capacitor part, the capacitor part having a first through-hole extending through the capacitor part in the thickness direction and defining an inner wall surface, the capacitor part including: an anode plate including a core part and a porous layer, a dielectric layer, and a cathode layer; and a first through-hole conductor disposed at least on the inner wall surface of the first through-hole, wherein the first through-hole conductor is electrically connected to an end face of the anode plate that faces the inner wall surface of the first through-hole in a plane direction, which is a direction of a plane perpendicular to the thickness direction, and the first void contains at least part of the first through-hole conductor.

14 Claims, 2 Drawing Sheets

(51) Int. Cl.
    *H01G 9/15*         (2006.01)
    *H01G 9/26*         (2006.01)

(56)            References Cited

U.S. PATENT DOCUMENTS

| | | | | |
|---|---|---|---|---|
| 2009/0159322 A1* | 6/2009 | Wu | .................. | H01G 9/012 |
| | | | | 29/25.42 |
| 2013/0233605 A1* | 9/2013 | Hsu | .................. | H01G 9/04 |
| | | | | 174/260 |

FOREIGN PATENT DOCUMENTS

| | | | | | | |
|---|---|---|---|---|---|---|
| JP | 2007173439 A | * | 7/2007 | ............ | H05K 1/162 |
| JP | 2007-251101 A | | 9/2007 | | |
| JP | 2008-078301 A | | 4/2008 | | |
| JP | 2008098487 A | * | 4/2008 | | |
| JP | 2008-130722 A | | 6/2008 | | |
| JP | 2008-277738 A | | 11/2008 | | |
| JP | 2012-124281 A | | 6/2012 | | |
| JP | 2012-128242 A | | 7/2012 | | |
| JP | 2020-053588 A | | 4/2020 | | |
| WO | WO-2019221046 A1 | * | 11/2019 | ............ | H01G 9/012 |

* cited by examiner

CAPACITOR HAVING A POROUS LAYER INCLUDING A VOID CONTAINING AT LEAST PART OF A THROUGH-HOLE CONDUCTOR

CROSS REFERENCE TO RELATED APPLICATIONS

The present application is a continuation of International application No. PCT/JP2022/022439, filed Jun. 2, 2022, which claims priority to Japanese Patent Application No. 2021-117803, filed Jul. 16, 2021, the entire contents of each of which are incorporated herein by reference.

TECHNICAL FIELD

The present invention relates to a capacitor.

BACKGROUND ART

Japanese Unexamined Patent Application Publication No. 8-321666 ("Patent Document 1") discloses a printed wiring board with an aluminum substrate serving as a conductive path. The printed wiring board includes the aluminum substrate, a connection layer, an insulating layer, a through-hole, a copper circuit, a second copper plating layer, and the conductive path. The aluminum substrate has a clearance hole extending through the aluminum substrate. The connection layer covers the surface of the aluminum substrate. The connection layer includes a zinc layer, a nickel plating layer, and a first copper plating layer, which are arranged in the stated order from the inner layer portion. A surface layer of the connection layer that covers the front side of the aluminum substrate and the interior of the clearance hole is subjected to black oxide treatment. The insulating layer is connected to the aluminum substrate with the black-oxide-treated connection layer interposed therebetween. The through-hole is provided in a portion of the insulating layer where the clearance hole is located. The through-hole is smaller in diameter than the clearance hole. The copper circuit is disposed on the outer surface of the insulating layer. The second copper plating layer is disposed near the back side of the aluminum substrate. The conductive path is disposed inside the through-hole. The conductive path communicates the copper circuit and the second copper plating layer with each other.

Japanese Unexamined Patent Application Publication No. 2020-53588 ("Patent Document 2") discloses a solid electrolytic capacitor. The solid electrolytic capacitor includes a multilayer body, an outer packaging, an anode outer electrode, and a cathode outer electrode. The multilayer body is a stack of capacitor elements. Each capacitor element includes: an anode body including a porous layer on a surface of an anode core part; a dielectric layer disposed on a surface of the porous layer; a solid electrolyte layer disposed on a surface of the dielectric layer; and a cathode part disposed on a surface of the solid electrolyte layer. The outer packaging covers the multilayer body. The anode outer electrode is disposed on a first end face of the outer packaging. The anode outer electrode is electrically connected to the anode core part. The cathode outer electrode is disposed on a second end face of the outer packaging opposite from the first end face. The cathode outer electrode is electrically connected to the cathode part. At a location near the first end face of the outer packaging, an end face of the anode core part is positioned inward relative to an end face of the porous layer. The distance between the end face of the anode core part and an inner face of the anode outer electrode is greater than or equal to 0.01 μm and less than or equal to 20 μm. An extended conductor connects between the end face of the anode core part and the inner face of the anode outer electrode.

SUMMARY OF THE INVENTION

In the printed wiring board described in Patent Document 1, the aluminum substrate serving as the conductive path is a bulk substrate. This makes it more difficult to reduce the connection resistance between the aluminum substrate and the connection layer, in comparison to a case where, as with the solid electrolytic capacitor described in Patent Document 2, the aluminum substrate includes the porous layer on the surface of an aluminum core part. Therefore, using the printed wiring board described in Patent Document 1 for a capacitor is unlikely to lead to improved reliability.

By contrast, the solid electrolytic capacitor described in Patent Document 2 employs the anode body including the porous layer on the surface of the anode core part. With the solid electrolytic capacitor described in Patent Document 2, however, in forming the extended conductor, the end face of the anode core part is subjected to a plating process including a zincate process. The plating process is likely to cause corrosion of the porous layer. Consequently, with the solid electrolytic capacitor described in Patent Document 2, the porous layer is prone to developing defects. This makes it difficult to improve reliability. With the solid electrolytic capacitor described in Patent Document 2, the absence of metallic bond between the end face of the porous layer and the inner face of the anode outer electrode makes it more difficult to reduce the connection resistance between the porous layer and the anode outer electrode, and consequently to improve reliability.

The present invention has been made to address the problems mentioned above. Accordingly, it is an object of the present invention to provide a capacitor with improved reliability.

A capacitor according to the present invention includes: a capacitor layer including a capacitor part, the capacitor part having a first through-hole extending through the capacitor part in the thickness direction and defining an inner wall surface, wherein the capacitor part includes: an anode plate including a core part and a porous layer on at least one major face of the core part, the porous layer including a first void, a dielectric layer on a surface of the porous layer, and a cathode layer on a surface of the dielectric layer; and a first through-hole conductor disposed at least on the inner wall surface of the first through-hole, wherein the first through-hole conductor is electrically connected to an end face of the anode plate that faces the inner wall surface of the first through-hole in a plane direction, the plane direction being a direction of a plane perpendicular to the thickness direction, and the first void contains at least part of the first through-hole conductor.

The present invention makes it possible to provide a capacitor with improved reliability.

DETAILED DESCRIPTION OF THE PREFERRED EMBODIMENTS

A capacitor according to the present invention is described below. The present invention is not limited to the configurations described below but may be modified as appropriate without departing from the scope of the present invention. The present invention also encompasses combinations of individual preferred features described hereinbelow.

The capacitor according to the present invention includes a capacitor layer, and a through-hole conductor. The capacitor layer includes a capacitor part. The through-hole conductor extends through the capacitor part in the thickness direction of the capacitor layer.

An exemplary capacitor according to the present invention is described below with reference to drawings illustrating a capacitor array, which is an array of capacitors each representing the exemplary capacitor according to the present invention.

Figure 1:
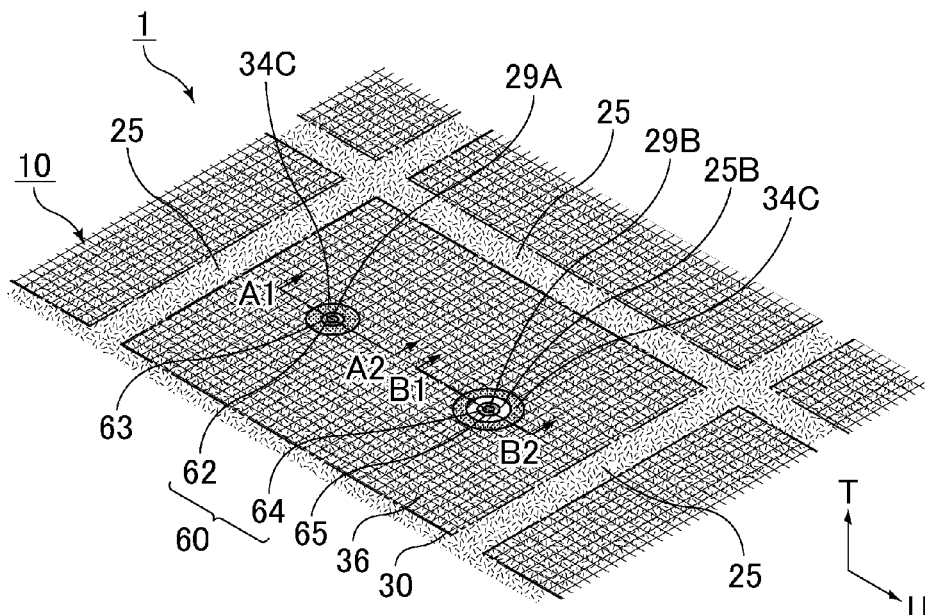
FIG. 1 is a schematic perspective view of a capacitor array, which is an array of capacitors each representing an exemplary capacitor according to the present invention.

FIG. 1 is a schematic perspective view of a capacitor array, which is an array of capacitors each representing an exemplary capacitor according to the present invention.

A capacitor array 1 illustrated in FIG. 1 includes a capacitor layer 10, and a through-hole conductor 60.

The capacitor layer 10 may include a plurality of capacitor parts 30 as illustrated in FIG. 1, or may include a single capacitor part 30.

In a preferred embodiment, if the capacitor layer 10 includes a plurality of capacitor parts 30, the capacitor parts 30 are arranged in a planar configuration such that the capacitor parts 30 are separated from each other by a plurality of parts extending through the capacitor layer 10. Each of the capacitor parts 30 constitutes a capacitor.

If the capacitor layer 10 includes a plurality of capacitor parts 30, the capacitor parts 30 may be arranged in a linear configuration, or may be arranged in a planar configuration. The capacitor parts 30 may be arranged in a regular fashion, or may be arranged in an irregular fashion. In terms of size, planar shape, and other features, all of the capacitor parts 30 may be identical, or some or all of the capacitor parts 30 may be different.

The capacitor layer 10 may include two or more kinds of capacitor parts 30 with different surface areas.

The capacitor layer 10 may include the capacitor part 30 having a planar shape that is not a rectangle. As used herein, the term rectangle refers to a square or an oblong. The capacitor layer 10 may thus include the capacitor part 30 having a non-rectangular planar shape, examples of which include: a polygon such as a quadrangle, a triangle, a pentagon, or a hexagon; a shape including a curved portion; a circle; and an ellipse. In this case, the capacitor layer 10 may include two or more kinds of capacitor parts 30 with different planar shapes. The capacitor layer 10 may, in addition to the capacitor part 30 having a non-rectangular planar shape, include the capacitor part 30 having a rectangular planar shape, or include no capacitor part 30 having a rectangular planar shape.

If the capacitor layer 10 includes a single capacitor part 30, the capacitor array 1 corresponds to a single capacitor.

The through-hole conductor 60, more specifically, each of a first through-hole conductor 62 and a second through-hole conductor 64 extends through the capacitor part 30 in a thickness direction T of the capacitor layer 10.

In the capacitor according to the present invention, the capacitor part includes an anode plate, a dielectric layer, and a cathode layer. The anode plate includes a porous layer on at least one major face. The dielectric layer is disposed on the surface of the porous layer. The cathode layer is disposed on the surface of the dielectric layer.

Figure 2:
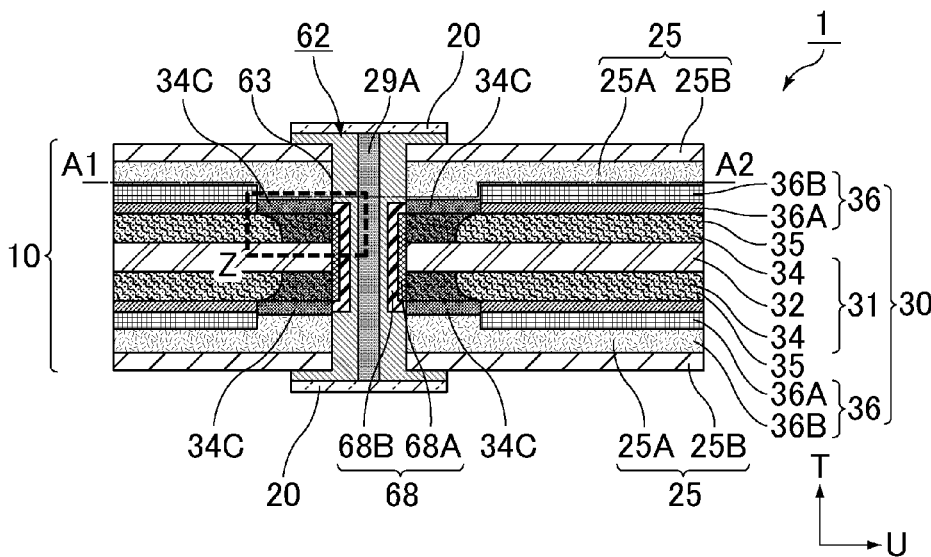
FIG. 2 schematically illustrates an exemplary cross-section of the capacitor array, including a cross-section taken along a line segment A1-A2 in FIG. 1.

FIG. 2 schematically illustrates an exemplary cross-section of the capacitor array, including a cross-section taken along a line segment A1-A2 in FIG. 1. The line segment A1-A2 in FIG. 2 corresponds to the line segment A1-A2 in FIG. 1.

As illustrated in FIG. 2, the capacitor part 30 includes an anode plate 31, a dielectric layer 35, and a cathode layer 36.

The anode plate 31 includes a core part 32, and a porous layer 34.

In a preferred embodiment, the core part 32 is made of a metal, particularly a valve metal.

Examples of the valve metal include single metals such as aluminum, tantalum, niobium, titanium, and zirconium, and alloys containing at least one kind of these single metals. Particularly preferred among these is aluminum or an aluminum alloy.

The porous layer 34 is disposed on at least one major face of the core part 32. That is, the porous layer 34 may be disposed only on one major face of the core part 32, or may be disposed on both major faces of the core part 32 as illustrated in FIG. 2. The anode plate 31 thus includes the porous layer 34 on at least one major face.

In a preferred embodiment, the porous layer 34 is an etched layer formed by etching of the surface of the anode plate 31.

The internal structure of the porous layer 34 will be described later in detail.

In a preferred embodiment, the anode plate 31 is flat plate-shaped. In a more preferred embodiment, the anode plate 31 is foil-shaped. Thus, as used herein, the term "plate-shaped" is meant to include "foil-shaped."

The dielectric layer 35 is disposed on the surface of the porous layer 34. More specifically, the dielectric layer 35 is disposed along the surfaces (contours) of holes present in the porous layer 34.

In a preferred embodiment, the dielectric layer 35 is made of an oxide coating of the valve metal mentioned above.

For example, if the anode plate 31 is in the form of an aluminum foil, the anode plate 31 is subjected to anodization (also called chemical conversion coating) in an aqueous solution containing, for example, ammonium adipate to thereby form an oxide coating that serves as the dielectric layer 35. Since the dielectric layer 35 is formed along the surface of the porous layer 34, the resulting dielectric layer 35 includes pores (depressions).

The cathode layer 36 is disposed on the surface of the dielectric layer 35.

In a preferred embodiment, as illustrated in FIG. 2, the cathode layer 36 includes a solid electrolyte layer 36A, and a conductor layer 36B. The solid electrolyte layer 36A is disposed on the surface of the dielectric layer 35. The conductor layer 36B is disposed on the surface of the solid electrolyte layer 36A.

Examples of the material constituting the solid electrolyte layer 36A include conductive polymers such as polypyrroles, polythiophenes, and polyanilines. Preferred among these are polythiophenes, particularly poly(3,4-ethylenedioxythiophene) (PEDOT). Such a conductive polymer may contain a dopant such as polystyrene sulfonic acid (PSS).

In a preferred embodiment, the solid electrolyte layer 36A includes an inner layer that fills in the pores (depressions) of the dielectric layer 35, and an outer layer that covers the surface of the dielectric layer 35.

In a preferred embodiment, the conductor layer 36B includes at least one of a conductive resin layer and a metal layer. That is, the conductor layer 36B may include only a conductive resin layer, may include only a metal layer, or may include both a conductive resin layer and a metal layer.

Examples of the conductive resin layer include a conductive adhesive layer containing at least one kind of conductive filler selected from the group consisting of a silver filler, a copper filler, a nickel filler, and a carbon filler.

Examples of the metal layer include a metal plating film, and a metal foil. In a preferred embodiment, the metal layer is made of at least one kind of metal selected from the group consisting of nickel, copper, silver, and an alloy, the alloy containing at least one of nickel, copper, and silver as its major component.

As used herein, the term "major component" means an elemental component with the largest weight proportion.

The conductor layer 36B may include, for example, a carbon layer and a copper layer. The carbon layer is disposed on the surface of the solid electrolyte layer 36A. The copper layer is disposed on the surface of the carbon layer.

The carbon layer is formed in a predetermined region by, for example, coating the surface of the solid electrolyte layer 36A with a carbon paste with a method such as sponge transfer, screen printing, application with a dispenser, or inkjet printing.

The copper layer is formed in a predetermined region by, for example, coating the surface of the carbon layer with a method such as sponge transfer, screen printing, spraying, application with a dispenser, or inkjet printing.

As described above, the capacitor part 30 illustrated in FIG. 2 includes the anode plate 31, the dielectric layer 35, and the cathode layer 36. The anode plate 31 includes the porous layer 34 on at least one major face. The dielectric layer 35 is disposed on the surface of the porous layer 34. The cathode layer 36 is disposed on the surface of the dielectric layer 35. The capacitor part 30 thus constitutes an electrolytic capacitor. In this case, if the cathode layer 36 includes the solid electrolyte layer 36A, the capacitor part 30 constitutes a solid electrolytic capacitor.

In the capacitor according to the present invention, the through-hole conductor includes a first through-hole conductor disposed at least on the inner wall surface of a first through-hole, which extends through the capacitor part in the thickness direction. The first through-hole conductor is electrically connected to an end face of the anode plate that faces the inner wall surface of the first through-hole in a plane direction, which is the direction of a plane perpendicular to the thickness direction.

As illustrated in FIG. 2, the first through-hole conductor 62 extends through the capacitor part 30 in the thickness direction T of the capacitor layer 10. More specifically, the first through-hole conductor 62 is disposed at least on the inner wall surface of a first through-hole 63, which extends through the capacitor part 30 in the thickness direction T.

The first through-hole conductor 62 is electrically connected to an end face of the anode plate 31 that faces the inner wall surface of the first through-hole 63 in a plane direction U, which is the direction of a plane perpendicular to the thickness direction T. In the example illustrated in

FIG. 2, the first through-hole conductor 62 is connected to the end face of the anode plate 31.

As for the plane direction U, although a plurality of such plane directions exist in actuality, one representative example of such plane directions is depicted in FIG. 1, FIG. 2, and other figures.

The core part 32 and the porous layer 34 are exposed on an end face of the anode plate 31 that is electrically connected to the first through-hole conductor 62. Consequently, in addition to the core part 32, the porous layer 34 is also electrically connected to the first through-hole conductor 62.

The first through-hole conductor 62 is formed by, for example, a method described below. First, by drilling, laser processing, or other methods, the first through-hole 63 is formed at a location where the first through-hole conductor 62 is to be formed. Subsequently, the inner wall surface of the first through-hole 63 is metallized with a low-resistance metal such as copper, gold, or silver to thereby form the first through-hole conductor 62. At this time, the formation of the first through-hole conductor 62 is facilitated by, for example, metallizing the inner wall surface of the first through-hole 63 through a process such as electroless copper plating or electrolytic copper plating. The first through-hole conductor 62 may be formed by a method other than metallizing the inner wall surface of the first through-hole 63, such as filling the first through-hole 63 with a material such as a metal or a composite of a metal and a resin.

In a preferred embodiment of the capacitor according to the present invention, the first through-hole conductor includes an anode connection layer located at the end face of the anode plate, and the anode connection layer is in contact with the end face of the anode plate.

In a preferred embodiment, as illustrated in FIG. 2, the first through-hole conductor 62 includes an anode connection layer 68 located at the end face of the anode plate 31. In a preferred embodiment, as illustrated in FIG. 2, the anode connection layer 68 is in contact with the end face of the anode plate 31.

As described above, the first through-hole conductor 62 includes the anode connection layer 68 located at the end face of the anode plate 31. The anode connection layer 68 thus serves as a barrier layer for the anode plate 31, more specifically, a barrier layer for the core part 32 and for the porous layer 34. Using the anode connection layer 68 described above reduces the risk of the anode plate 31 dissolving during treatment (described later) with a chemical solution performed for forming, for example, a conductive part 20, and consequently reduces the risk of the chemical solution entering the capacitor part 30. This facilitates improved reliability of the capacitor array 1, and consequently improved reliability of the capacitor constituting the capacitor array 1.

As illustrated in FIG. 2, the anode connection layer 68 may include a first anode connection layer 68A, and a second anode connection layer 68B, which are disposed in the stated order as seen from the end face of the anode plate 31.

As for the anode connection layer 68, for example, the first anode connection layer 68A may be a layer containing zinc as a major component, and the second anode connection layer 68B may be a layer containing nickel or copper as a major component. In this case, the first anode connection layer 68A is formed on the end face of the anode plate 31 by, for example, depositing zinc by displacement through a zincate process. The second anode connection layer 68B is then formed on the surface of the first anode connection layer 68A through, for example, electroless nickel plating or electroless copper plating. In some cases, the first anode connection layer 68A may disappear during formation of the second anode connection layer 68B. In such cases, the anode connection layer 68 may include only the second anode connection layer 68B.

In a preferred embodiment, the anode connection layer 68 includes a layer containing nickel as a major component.

This allows for reduced damage to the metal (e.g., aluminum) constituting the anode plate 31, and consequently facilitates improved barrier properties of the anode connection layer 68 with respect to the anode plate 31.

In a preferred embodiment, in the thickness direction T, the anode connection layer 68 has a dimension greater than the dimension of the anode plate 31 as illustrated in FIG. 2. In this case, the entire end face of the anode plate 31 is covered by the anode connection layer 68. This facilitates improved barrier properties of the anode connection layer 68 with respect to the anode plate 31.

In a preferred embodiment, in the thickness direction T, the anode connection layer 68 has a dimension greater than 100% and less than or equal to 200% of the dimension of the anode plate 31.

Alternatively, in the thickness direction T, the anode connection layer 68 may have a dimension equal to the dimension of the anode plate 31, or may have a dimension less than the dimension of the anode plate 31.

The first through-hole conductor 62 may include no anode connection layer 68 located at the end face of the anode plate 31.

In a preferred embodiment of the capacitor according to the present invention, when viewed in the thickness direction, the first through-hole conductor is electrically connected to the end face of the anode plate across the entire circumference of the first through-hole.

In a preferred embodiment, as illustrated in FIG. 1 and FIG. 2, when viewed in the thickness direction T, the first through-hole conductor 62 is electrically connected to the end face of the anode plate 31 across the entire circumference of the first through-hole 63. In a preferred embodiment, as illustrated in FIG. 2, if the first through-hole conductor 62 has the anode connection layer 68 located at the end face of the anode plate 31, a portion of the first through-hole conductor 62 other than the anode connection layer 68 is, when viewed in the thickness direction T, connected to the anode connection layer 68 across the entire circumference of the first through-hole 63. The above-mentioned configuration leads to an increased area of contact between the anode connection layer 68, and the portion of the first through-hole conductor 62 other than the anode connection layer 68, and consequently facilitates reduced connection resistance between the anode connection layer 68, and the portion of the first through-hole conductor 62 other than the anode connection layer 68. This in turn facilitates reduced connection resistance between the first through-hole conductor 62 and the anode plate 31, and consequently facilitates reduced equivalent series resistance (ESR) of the capacitor part 30. Further, the above-mentioned configuration facilitates improved adhesion between the anode connection layer 68, and the portion of the first through-hole conductor 62 other than the anode connection layer 68. This allows for reduced risk of problems such as separation, due to thermal stress, between the anode connection layer 68, and the portion of the first through-hole conductor 62 other than the anode connection layer 68.

In a preferred embodiment, as illustrated in FIG. 2, the capacitor array 1, more specifically, the capacitor constituting the capacitor array 1 further includes the conductive part 20 electrically connected to the first through-hole conductor 62. In the example illustrated in FIG. 2, the conductive part 20 is disposed on the surface of the first through-hole conductor 62. The conductive part 20 is capable of serving as a connection terminal of the capacitor array 1, more specifically, a connection terminal of the capacitor part 30.

Examples of the material constituting the conductive part 20 include a low-resistance metal such as copper, gold, or silver. In this case, the conductive part 20 is formed by, for example, plating applied on the surface of the first through-hole conductor 62.

From the viewpoint of improving the adhesion between the conductive part 20 and another component, which in this case is the adhesion between the conductive part 20 and the first through-hole conductor 62, the conductive part 20 may be made of a composite material including a resin and at least one kind of conductive filler selected from the group consisting of a silver filler, a copper filler, a nickel filler, and a carbon filler.

In a preferred embodiment, as illustrated in FIG. 1 and FIG. 2, the capacitor array 1, more specifically, the capacitor constituting the capacitor array 1 further includes a first resin-filled part 29A, which is a part where the first through-hole 63 is filled with a resin material. In the example illustrated in FIG. 1 and FIG. 2, the first resin-filled part 29A is located in a space surrounded by the first through-hole conductor 62 disposed on the inner wall surface of the first through-hole 63. The presence of the first resin-filled part 29A results in elimination of space inside the first through-hole 63. This leads to reduced risk of delamination of the first through-hole conductor 62.

In a preferred embodiment, the first resin-filled part 29A has a thermal expansion coefficient greater than the thermal expansion coefficient of the first through-hole conductor 62. More specifically, in a preferred embodiment, the resin material filled in the first through-hole 63 has a thermal expansion coefficient greater than the thermal expansion coefficient of the material (e.g., copper) constituting the first through-hole conductor 62. In this case, as the first resin-filled part 29A, more specifically, the resin material filled in the first through-hole 63 expands under high temperature environment, the first through-hole conductor 62 is pressed outward from the inner side portion of the first through-hole 63 onto the inner wall surface of the first through-hole 63. This allows for sufficient reduction of the risk of delamination of the first through-hole conductor 62.

The thermal expansion coefficient of the first resin-filled part 29A may be equal to the thermal expansion coefficient of the first through-hole conductor 62, or may be less than the thermal expansion coefficient of the first through-hole conductor 62. More specifically, the thermal expansion coefficient of the resin material filled in the first through-hole 63 may be equal to the thermal expansion coefficient of the material constituting the first through-hole conductor 62, or may be less than the thermal expansion coefficient of the material constituting the first through-hole conductor 62.

The capacitor array 1, more specifically, the capacitor constituting the capacitor array 1 may have no first resin-filled part 29A. In this case, in a preferred embodiment, the first through-hole conductor 62 is disposed not only on the inner wall surface of the first through-hole 63 but in the entire interior of the first through-hole 63.

In a preferred embodiment, as illustrated in FIG. 2, the capacitor layer 10 further includes an insulating part 25 disposed on the surface of the capacitor part 30.

In a preferred embodiment, as illustrated in FIG. 2, the insulating part 25 includes a first insulating part 25A, and a second insulating part 25B. The first insulating part 25A is disposed on the surface of the capacitor part 30. The second insulating part 25B is disposed on the surface of the first insulating part 25A.

Each of the first insulating part 25A and the second insulating part 25B is made of, for example, a resin material such as epoxy, phenol, or polyimide, or a composite material including a mixture of a resin material such as epoxy, phenol, or polyimide and an inorganic filler such as silica or alumina.

The first insulating part 25A and the second insulating part 25B may be made of the same material, or may be made of different materials.

Reference is now made to the internal structure of the porous layer.

In the capacitor according to the present invention, the porous layer includes a first void, and the first void contains part of the first through-hole conductor.

Figure 3:
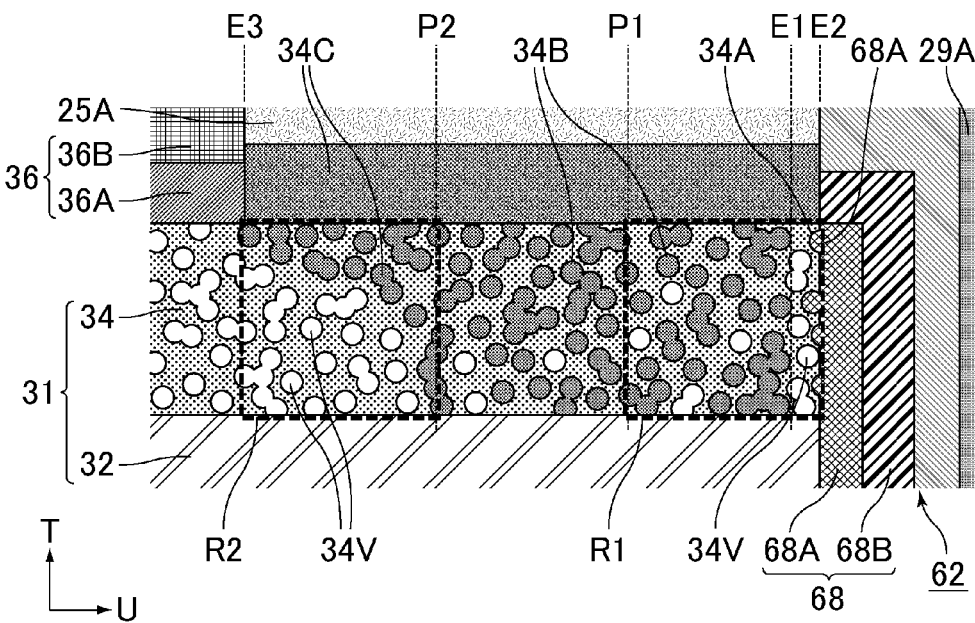
FIG. 3 schematically illustrates an enlarged cross-section of a region Z illustrated in FIG. 2.

FIG. 3 schematically illustrates an enlarged cross-section of a region Z illustrated in FIG. 2.

Although not illustrated in FIG. 3, the dielectric layer 35 is disposed on the surface of the porous layer 34, more specifically, along the surfaces (contours) of holes present in the porous layer 34.

As illustrated in FIG. 3, the porous layer 34 includes a first void 34A.

The first void 34A contains part of the first through-hole conductor 62. In the example illustrated in FIG. 3, the first void 34A contains part of the anode connection layer 68, more specifically, part of the first anode connection layer 68A. This facilitates improved adhesion between the porous layer 34 and the first through-hole conductor 62, more specifically, improved adhesion between the porous layer 34 and the anode connection layer 68. This reduces the risk of problems such as separation between the porous layer 34 and the first through-hole conductor 62, more specifically, separation between the porous layer 34 and the anode connection layer 68. This in turn leads to improved reliability of the capacitor array 1, and consequently to improved reliability of the capacitor constituting the capacitor array 1.

The presence, within the porous layer, of the first void that contains part of the first through-hole conductor is identified, for example, in a manner as described below. First, the capacitor, which in this case is the capacitor array, is sectioned to expose a cross-section of the capacitor taken in the thickness direction as illustrated in FIG. 2. The cross-section passes through the center of the first through-hole when viewed in the thickness direction, and includes the porous layer and the first through-hole conductor. Then, an enlarged image, as illustrated in FIG. 3, of the porous layer in the exposed cross-section of the capacitor, which in this case is the exposed cross-section of the capacitor array, is captured with a scanning electron microscope (SEM). Then, elemental mapping is performed on the obtained enlarged image by a method such as wavelength dispersive X-ray spectroscopy (WDX) or energy dispersive X-ray spectroscopy (EDX) to thereby identify, within the porous layer, the first void that contains part of the first through-hole conductor.

In a preferred embodiment of the capacitor according to the present invention, the first void is located at an end face of the porous layer that defines an end face of the anode plate.

As illustrated in FIG. 3, in a preferred embodiment, the first void 34A is located at an end face of the porous layer 34 that defines an end face of the anode plate 31. In this case, the first void 34A is exposed on the end face of the porous layer 34. It can be thus said that, in a state before part of the first through-hole conductor 62 becomes contained in the first void 34A, the end face of the porous layer 34 has microscopic irregularities.

If the end face of the porous layer 34 has microscopic irregularities, the first through-hole conductor 62, which is connected to the end face of the porous layer 34, penetrates into a depression on the end face of the porous layer 34, more specifically, into the first void 34A. For example, as illustrated in FIG. 3, if the first through-hole conductor 62 includes the anode connection layer 68 located at the end face of the anode plate 31, the presence of microscopic irregularities on the end face of the porous layer 34 allows the anode connection layer 68, more specifically, the first anode connection layer 68A, to penetrate into a depression, more specifically, the first void 34A on the end face of the porous layer 34. This facilitates further improved adhesion between the porous layer 34 and the anode connection layer 68. This in turn results in reduced risk of problems such as separation between the porous layer 34 and the anode connection layer 68, leading to further improved reliability of the capacitor array 1 and consequently to further improved reliability of the capacitor constituting the capacitor array 1.

In a preferred embodiment of the capacitor according to the present invention, the porous layer further includes a second pore, the second pore contains an insulating material, the porous layer includes an insulating region where the insulating material contained in the second pore exists, and in the plane direction, an outer end of the insulating region near the first through-hole conductor is located farther away from the first through-hole conductor than is an outer end of the porous layer near the first through-hole conductor.

As illustrated in FIG. 3, the porous layer 34 further includes a second pore 34B.

The second pore 34B contains an insulating material 34C. The porous layer 34 thus includes an insulating region where the insulating material 34C contained in the second pore 34B exists. The presence of the insulating region in the porous layer 34 ensures insulation between the anode plate 31 and the cathode layer 36, and prevents shorting between the anode plate 31 and the cathode layer 36.

In FIG. 3, a hatched region representative of the insulating material 34C in the porous layer 34 corresponds to the insulating region. As can be appreciated, the insulating region is a region that exists within the porous layer 34 not in a continuous manner but in a discontinuous manner.

As illustrated in FIG. 1 and FIG. 2, in a preferred embodiment, the insulating region where the insulating material 34C exists is disposed around the first through-hole conductor 62. This sufficiently ensures insulation between the anode plate 31 and the cathode layer 36, and sufficiently prevents shorting between the anode plate 31 and the cathode layer 36.

The insulating material 34C is, for example, a resin material such as epoxy, phenol, or polyimide, or a composite material including a mixture of a resin material such as epoxy, phenol, or polyimide and an inorganic filler such as silica or alumina.

As illustrated in FIG. 3, in the plane direction U, an outer end E1, which is an outer end of the insulating region near the first through-hole conductor 62, is located farther away (to the left in the present example) from the first through-hole conductor 62 than is an outer end E2, which is an outer end of the porous layer 34 near the first through-hole conductor 62. As a result, at an end face of the porous layer 34 that defines an end face of the anode plate 31, a portion of the porous layer 34 that is made of a material (e.g., aluminum) other than the insulating material 34C has a comparatively large surface area.

As described above, at the end face of the porous layer 34, a portion of the porous layer 34 that is made of a material other than the insulating material 34C has a comparatively large surface area. This results in improved coverage of the first through-hole conductor 62, which is connected to the end face of the porous layer 34. For example, as illustrated in FIG. 3, for a case where the first through-hole conductor 62 includes the anode connection layer 68 located at the end face of the anode plate 31, if a portion of the porous layer 34 that is made of a material other than the insulating material 34C has a comparatively large surface area at the end face of the porous layer 34, this leads to improved coverage of the anode connection layer 68, more specifically, the first anode connection layer 68A. The improved coverage of the anode connection layer 68 with respect to the end face of the porous layer 34 leads to improved barrier properties of the anode connection layer 68 with respect to the porous layer 34, and consequently to improved barrier properties of the anode connection layer 68 with respect to the anode plate 31. This reduces the risk of the anode plate 31 dissolving during treatment with a chemical solution performed for forming, for example, the conductive part 20, and consequently reduces the risk of the chemical solution entering the capacitor part 30. This in turn facilitates further improved reliability of the capacitor array 1, and consequently further improved reliability of the capacitor constituting the capacitor array 1.

If a portion of the porous layer 34 that is made of a material other than the insulating material 34C has a comparatively large surface area at the end face of the porous layer 34, this facilitates electrical connection with the first through-hole conductor 62 not only in the core part 32 but also in the porous layer 34, leading to reduced connection resistance between the first through-hole conductor 62 and the anode plate 31. As a result, the equivalent series resistance of the capacitor part 30 decreases. This leads to further improved reliability of the capacitor array 1, and consequently to further improved reliability of the capacitor constituting the capacitor array 1.

An outer end of the insulating region near the first through-hole conductor is determined, for example, in a manner as described below with respect to the cross-section taken in the thickness direction as illustrated in FIG. 2, which is a cross-section that passes through the center of the first through-hole when viewed in the thickness direction and that includes the porous layer and the first through-hole conductor. First, the capacitor, which in this case is the capacitor array, is sectioned to expose the above-mentioned cross-section as illustrated in FIG. 2. Then, an enlarged image, as illustrated in FIG. 3, of the porous layer in the exposed cross-section of the capacitor, which in this case is the exposed cross-section of the capacitor array, is captured with a scanning electron microscope. Subsequently, elemental mapping is performed on the obtained enlarged image by wavelength dispersive X-ray spectroscopy to thereby identify, within the porous layer, the insulating region where the insulating material exists. Then, an end portion of the insulating region that is located closest to the first through-hole conductor in the plane direction is determined as an outer end of the insulating region near the first through-hole conductor.

An outer end of the porous layer near the first through-hole conductor is determined, for example, in a manner as described below. First, elemental mapping is performed by wavelength dispersive X-ray spectroscopy on the enlarged image obtained by the above-mentioned method to thereby identify the entire extent of the porous layer including the insulating region. Then, an end portion of the porous layer that is located closest to the first through-hole conductor in the plane direction is determined as an outer end of the porous layer near the first through-hole conductor.

With the capacitor according to the present invention, it may suffice that in the plane direction, the outer end of the insulating region near the first through-hole conductor, which is determined by the method mentioned above, be located farther away from the first through-hole conductor than is the outer end of the porous layer near the first through-hole conductor, which is determined by the method mentioned above.

For example, during manufacture of the capacitor according to the present invention, which in this case is the capacitor array, after void holes in the porous layer are filled with the insulating material, the insulating material that exists near the end face of the porous layer is selectively removed by a method such as plasma treatment. In this way, in the plane direction, the outer end of the insulating region near the first through-hole conductor is adjusted to be located farther away from the first through-hole conductor than is the outer end of the porous layer near the first through-hole conductor.

In a preferred embodiment, in the plane direction U, the outer end E1 of the insulating region near the first through-hole conductor 62, and the outer end E2 of the porous layer 34 near the first through-hole conductor 62 have a distance between each other of greater than $0\,\mu m$ and less than $20\,\mu m$.

In a preferred embodiment of the capacitor according to the present invention, the porous layer includes a first region, which is defined as a region spanning from the outer end of the porous layer near the first through-hole conductor to a position spaced apart in the plane direction by a distance equal to the thickness of the porous layer, and the void area fraction in the first region is greater than or equal to 0 area% and less than or equal to 30 area%.

In a preferred embodiment, as illustrated in FIG. 3, the porous layer 34 includes a first region R1, which is defined as a region spanning from the outer end E2 of the porous layer 34 near the first through-hole conductor 62 to a position P1 spaced apart in the plane direction U by a distance equal to the thickness of the porous layer 34, and the void area fraction in the first region R1 is greater than or equal to 0 area% and less than or equal to 30 area%. That is, in a preferred embodiment, in the first region R1 near the end face of the porous layer 34, voids that do not contain any material, including the first through-hole conductor 62 and the insulating material 34C, have a low area fraction that is greater than or equal to 0 area% and less than or equal to 30 area%. This reduces the risk that, in forming the first through-hole conductor 62 connected to the end face of the porous layer 34, more specifically, the anode connection layer 68 through a plating process including a zincate process, a portion of the porous layer 34 near the end face may undergo excessive etching through such voids. This in turn results in reduced risk of corrosion caused by chlorine, water, or other substances remaining within the porous layer 34, leading to further improved reliability of the capacitor array 1 and consequently to further improved reliability of the capacitor constituting the capacitor array 1.

Now, a case is considered where the void area fraction in the first region R1 is greater than 30 area%. In this case, in forming the first through-hole conductor 62 connected to the end face of the porous layer 34, more specifically, the anode connection layer 68 through a plating process including a zincate process, a portion of the porous layer 34 near the end face undergoes excessive etching through voids. This leads to creation of an even larger space within the porous layer 34. This results in corrosion caused by chlorine, water, or other substances remaining within the porous layer 34, leading to reduced reliability of the capacitor array 1 and consequently to reduced reliability of the capacitor constituting the capacitor array 1.

The void area fraction in the first region is determined, for example, in a manner as described below with respect to the cross-section taken in the thickness direction as illustrated in FIG. 2, which is a cross-section that passes through the center of the first through-hole when viewed in the thickness direction and that includes the porous layer and the first through-hole conductor. First, the capacitor, which in this case is the capacitor array, is sectioned to expose the above-mentioned cross-section as illustrated in FIG. 2. Then, an enlarged image, as illustrated in FIG. 3, of the porous layer in the exposed cross-section of the capacitor, which in this case is the exposed cross-section of the capacitor array, is captured with a scanning electron microscope. Subsequently, elemental mapping is performed on the obtained enlarged image by wavelength dispersive X-ray spectroscopy to thereby identify a region where voids exist within the porous layer. At this time, voids exposed on the end face of the porous layer are also regarded as being included in the above-mentioned region where voids exist. Meanwhile, the outer end of the porous layer near the first through-hole conductor is determined in advance by the above-mentioned method, and the first region is identified within the porous layer, which is a region that spans from the outer end of the porous layer near the first through-hole conductor to the position spaced apart in the plane direction by a distance equal to the thickness of the porous layer. Then, the area fraction of the region where voids exist in the first region is measured by image analysis software. The area fraction thus measured is determined as the void area fraction in the first region.

With the method mentioned above, the region where voids exist is identified by performing, on the exposed cross-section of the capacitor, elemental mapping that employs a combination of a scanning electron microscope and wavelength dispersive X-ray spectroscopy. Alternatively, however, the region where voids exist may be identified by another analysis method such as elemental mapping that employs a combination of a scanning electron microscope and energy dispersive X-ray spectroscopy.

FIG. 3 depicts, as each void, a void hole 34V that does not contain any material, including the first through-hole conductor 62 and the insulating material 34C. However, examples of the void also include, other than the void hole 34V, a portion that is inside a hole containing some material, such as the first void 34A or the second void 34B, and that is not completely filled with such a material.

In a preferred embodiment of the capacitor according to the present invention, during manufacture of the capacitor, which in this case is the capacitor array, after void holes in the porous layer are filled with the insulating material, the insulating material that exists near the end face of the porous layer is selectively removed by a method such as plasma treatment to thereby adjust the void area fraction in the first region to be greater than or equal to 0 area% and less than or equal to 30 area%.

In a preferred embodiment of the capacitor according to the present invention, the porous layer includes a second region, which is defined as a region spanning from an outer end of the insulating region opposite from the first through-hole conductor to a position spaced apart in the plane direction toward the first through-hole conductor by a distance equal to the thickness of the porous layer, and the void area fraction in the second region is greater than the void area fraction in the first region.

In a preferred embodiment, as illustrated in FIG. 3, the porous layer 34 includes a second region R2, which is defined as a region spanning from an outer end E3 of the insulating region opposite from the first through-hole conductor 62 to a position P2 spaced apart in the plane direction U toward the first through-hole conductor 62 by a distance equal to the thickness of the porous layer 34, and the void area fraction in the second region R2 is greater than the void area fraction in the first region R1. In this case, as illustrated in FIG. 3, even though the insulating region exists in the second region R2, the void area fraction in the second region R2 is greater than the void area fraction in the first region R1. That is, it can be said that even though the insulating region exists in the second region R2, the extent of the insulating region in the second region R2 is less than the extent of the insulating region in the first region R1.

In filling the second void 34B with the insulating material 34C, for example, the insulating material 34C is placed on the surface of the porous layer 34 (dielectric layer 35), so that the insulating material 34C is allowed to infiltrate in the thickness direction T from the surface of the porous layer 34, more specifically, toward the core part 32 from the surface of the porous layer 34.

At this time, as for the insulating material 34C placed on the surface of the porous layer 34, a portion of the insulating material 34C that is located opposite from the first through-hole conductor 62 spreads, on the surface of the porous layer 34, in the plane direction U away from the first through-hole conductor 62.

Further, as for the insulating material 34C placed on the surface of the porous layer 34, the portion of the insulating material 34C that is located opposite from the first through-hole conductor 62 seeps, within the porous layer 34, in the plane direction U away from the first through-hole conductor 62 while infiltrating in the thickness direction T. As the insulating material 34C seeps in the plane direction U as described above, the width of the seepage decreases from the surface of the porous layer 34 toward the core part 32. In this way, a region of seepage of the insulating material 34C is formed as a portion of the insulating region within the porous layer 34 that is located near the outer end E3, which is an outer end opposite from the first through-hole conductor 62.

As described above, although the insulating region exists in the second region R2, the insulating region in the second region R2 includes the region of seepage of the insulating material 34C. Therefore, the extent of the insulating region in the second region R2 is less than the extent of the insulating region in the first region R1. In other words, the void area fraction in the second region R2 is greater than the void area fraction in the first region R1.

From the above, it can be said that, if the void area fraction in the second region R2 is greater than the void area fraction in the first region R1, the second region R2 includes a region of seepage of the insulating material 34C that has been formed by the method mentioned above.

The void area fraction in the second region is determined, for example, in a manner as described below with respect to the cross-section taken in the thickness direction as illustrated in FIG. 2, which is a cross-section that passes through the center of the first through-hole when viewed in the thickness direction and that includes the porous layer and the first through-hole conductor. First, through the method mentioned above, a region where voids exist within the porous layer is identified. Meanwhile, through the method mentioned above, an insulating region within the porous layer is identified in advance. Then, an end portion of the insulating region that is located farthest away from the first through-hole conductor in the plane direction is determined as an outer end of the insulating region opposite from the first through-hole conductor. Then, the second region within the porous layer is identified. The second region is a region spanning from the outer end of the insulating region opposite from the first through-hole conductor to the position spaced apart in the plane direction toward the first through-hole conductor by a distance equal to the thickness of the porous layer. Then, the area fraction of the region where voids exist in the second region is measured by image analysis software. The area fraction thus measured is determined as the void area fraction in the second region.

In a preferred embodiment, the void area fraction in the first region R1 is greater than 0% and less than 80% of the void area fraction in the second region R2.

Although not illustrated in FIG. 3, the porous layer 34 may include, other than the first void 34A, the second void 34B, and the void hole 34V, a hole that contains a material other than the first through-hole conductor 62 and the insulating material 34C, for example, the solid electrolyte layer 36A.

In a preferred embodiment of the capacitor according to the present invention, the through-hole conductor further includes the second through-hole conductor, and the second through-hole conductor is electrically connected to the cathode layer. The second through-hole conductor is disposed at least on the inner wall surface of a second through-hole, which extends in the thickness direction through the capacitor part provided with the first through-hole conductor.

Figure 4:
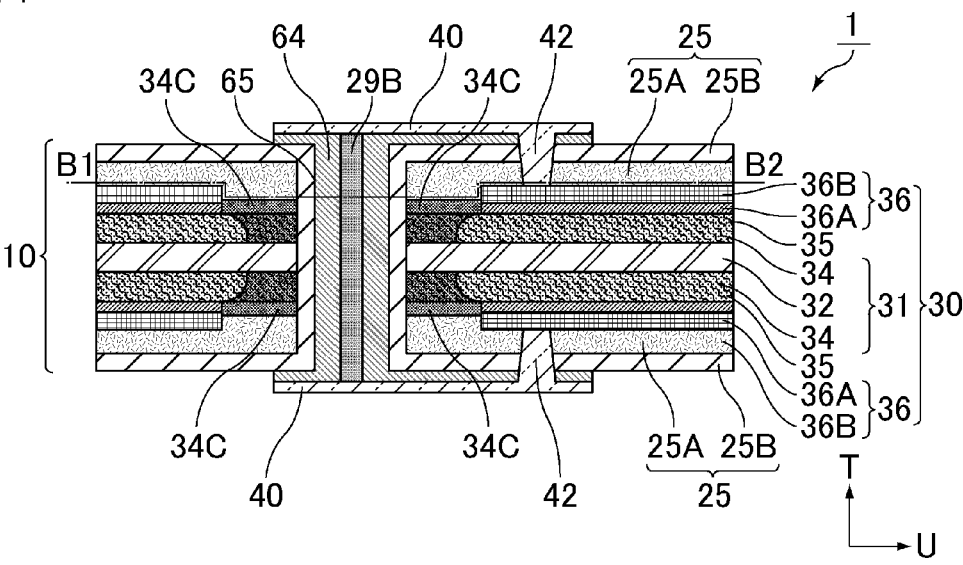
FIG. 4 schematically illustrates an exemplary cross-section of the capacitor array, including a cross-section taken along a line segment B1-B2 in FIG. 1.

FIG. 4 schematically illustrates an exemplary cross-section of the capacitor array, including a cross-section taken along a line segment B1-B2 in FIG. 1. The line segment B1-B2 in FIG. 4 corresponds to the line segment B1-B2 in FIG. 1.

As illustrated in FIG. 4, in a preferred embodiment, the capacitor array 1, more specifically, the capacitor constituting the capacitor array 1 further includes the second through-hole conductor 64.

As illustrated in FIG. 4, the second through-hole conductor 64 extends through the capacitor part 30 in the thickness direction T of the capacitor layer 10. More specifically, in a preferred embodiment, the second through-hole conductor 64 is disposed at least on the inner wall surface of a second through-hole 65. The second through-hole 65 extends in the thickness direction T through the capacitor part 30 provided with the first through-hole conductor 62 illustrated in, for example, FIG. 2.

As illustrated in FIG. 4, in a preferred embodiment, the second through-hole conductor 64 is electrically connected to the cathode layer 36. In the example illustrated in FIG. 4, a conductive part 40 is disposed on the surface of the second through-hole conductor 64. The conductive part 40 is capable of serving as a connection terminal of the capacitor array 1, more specifically, a connection terminal of the capacitor part 30. In the example illustrated in FIG. 4, a via-conductor 42 extends through the insulating part 25 in the thickness direction T to connect to the conductive part 40 and the cathode layer 36. Therefore, in the example illustrated in FIG. 4, the second through-hole conductor 64 is electrically connected to the cathode layer 36 via the conductive part 40 and the via-conductor 42. This allows for miniaturization of the capacitor array 1, and consequently miniaturization of the capacitor constituting the capacitor array 1.

The second through-hole conductor 64 is formed by, for example, a method described below. First, by drilling, laser processing, or other methods, a through-hole is formed at a location where the second through-hole conductor 64 is to be formed. The through-hole is then filled with the material (e.g., resin material) constituting the second insulating part 25B to thereby form an insulating layer. Then, the second through-hole 65 is formed in the insulating layer by drilling, laser processing, or other methods. At this time, the second through-hole 65 is formed with a diameter less than the diameter of the insulating layer. This results in a state in which the material constituting the second insulating part 25B exists between the previously formed through-hole and the second through-hole 65. Subsequently, the inner wall surface of the second through-hole 65 is metallized with a low-resistance metal such as copper, gold, or silver to thereby form the second through-hole conductor 64. At this time, the formation of the second through-hole conductor 64 is facilitated by, for example, metallizing the inner wall surface of the second through-hole 65 through a process such as electroless copper plating or electrolytic copper plating. The second through-hole conductor 64 may be formed by a method other than metallizing the inner wall surface of the second through-hole 65, such as filling the second through-hole 65 with a material such as a metal or a composite of a metal and a resin.

Examples of the material constituting the conductive part 40 include a low-resistance metal such as copper, gold, or silver. In this case, the conductive part 40 is formed by, for example, plating applied on the surface of the second through-hole conductor 64.

From the viewpoint of improving the adhesion between the conductive part 40 and another component, which in this case is the adhesion between the conductive part 40 and the second through-hole conductor 64, the conductive part 40 may be made of a composite material including a resin and at least one kind of conductive filler selected from the group consisting of a silver filler, a copper filler, a nickel filler, and a carbon filler.

The via-conductor 42 may be made of, for example, a material similar to the material constituting the conductive part 40.

The via-conductor 42 is formed, for example, by plating on the inner wall surface of a through-hole that extends through the insulating part 25 in the thickness direction T, or by filling such a through-hole with a conductive paste and then subjecting the conductive paste to heat treatment.

In a preferred embodiment, the capacitor array 1, more specifically, the capacitor constituting the capacitor array 1 further includes a second resin-filled part 29B as illustrated in FIG. 1 and FIG. 4. The second resin-filled part 29B is a part where the second through-hole 65 is filled with a resin material. In the example illustrated in FIG. 1 and FIG. 4, the second resin-filled part 29B is located in a space surrounded by the second through-hole conductor 64 disposed on the inner wall surface of the second through-hole 65. The presence of the second resin-filled part 29B results in elimination of space within the second through-hole 65. This leads to reduced risk of delamination of the second through-hole conductor 64.

In a preferred embodiment, the second resin-filled part 29B has a thermal expansion coefficient greater than the thermal expansion coefficient of the second through-hole conductor 64. More specifically, in a preferred embodiment, the resin material filled in the second through-hole 65 has a thermal expansion coefficient greater than the thermal expansion coefficient of the material (e.g., copper) constituting the second through-hole conductor 64. In this case, as the second resin-filled part 29B, more specifically, the resin material filled in the second through-hole 65 expands under high temperature environment, the second through-hole conductor 64 is pressed outward from the inner side portion of the second through-hole 65 onto the inner wall surface of the second through-hole 65. This allows for sufficient reduction of the risk of delamination of the second through-hole conductor 64.

Alternatively, the thermal expansion coefficient of the second resin-filled part 29B may be equal to the thermal expansion coefficient of the second through-hole conductor 64, or may be less than the thermal expansion coefficient of the second through-hole conductor 64. More specifically, the thermal expansion coefficient of the resin material filled in the second through-hole 65 may be equal to the thermal expansion coefficient of the material constituting the second through-hole conductor 64, or may be less than the thermal expansion coefficient of the material constituting the second through-hole conductor 64.

The capacitor array 1, more specifically, the capacitor constituting the capacitor array 1 may have no second resin-filled part 29B. In this case, in a preferred embodiment, the second through-hole conductor 64 is disposed not only on the inner wall surface of the second through-hole 65 but in the entire interior of the second through-hole 65.

In a preferred embodiment of the capacitor according to the present invention, the capacitor layer further includes the first insulating part disposed on the surface of the capacitor part, and the second insulating layer disposed on the surface of the first insulating part, and the second insulating part extends between the anode plate and the second through-hole conductor.

In a preferred embodiment, as with the configuration illustrated in FIG. 2, the capacitor layer 10 further includes the insulating part 25 disposed on the surface of the capacitor part 30 as illustrated in FIG. 4.

In a preferred embodiment, as with the configuration illustrated in FIG. 2, the insulating part 25 includes the first insulating part 25A disposed on the surface of the capacitor part 30, and the second insulating part 25B disposed on the surface of the first insulating part 25A as illustrated in FIG. 4.

That is, in a preferred embodiment, the capacitor layer 10 further includes the first insulating part 25A disposed on the surface of the capacitor part 30, and the second insulating part 25B disposed on the surface of the first insulating part 25A.

In a preferred embodiment, if the capacitor layer 10 includes the first insulating part 25A and the second insulating part 25B, the second insulating part 25B extends between the anode plate 31 and the second through-hole conductor 64 as illustrated in FIG. 4. In the example illustrated in FIG. 4, the second insulating part 25B is in contact with both the anode plate 31 and the second through-hole conductor 64. The presence of the second insulating part 25B extending between the anode plate 31 and the second through-hole conductor 64 ensures insulation between the anode plate 31 and the second through-hole conductor 64, and consequently insulation between the anode plate 31 and the cathode layer 36, and prevents shorting between the anode plate 31 and the cathode layer 36.

In a preferred embodiment, if the second insulating part 25B extends between the anode plate 31 and the second through-hole conductor 64, the core part 32 and the porous layer 34 are exposed on an end face of the anode plate 31 that makes contact with the second insulating part 25B as illustrated in FIG. 4. This results in increased area of contact between the second insulating part 25B and the porous layer 34, and consequently improved adhesion therebetween. This in turn reduces the risk of problems such as separation between the second insulating part 25B and the porous layer 34.

In a preferred embodiment, if the core part 32 and the porous layer 34 are exposed on an end face of the anode plate 31 that makes contact with the second insulating part 25B, an insulating region where the insulating material 34C exists is disposed around the second through-hole conductor 64 as illustrated in FIG. 4 as a result of void holes in the porous layer 34 being filled with the insulating material 34C. This sufficiently ensures insulation between the anode plate 31 and the second through-hole conductor 64, and consequently insulation between the anode plate 31 and the cathode layer 36, and prevents shorting between the anode plate 31 and the cathode layer 36.

In a preferred embodiment, if the core part 32 and the porous layer 34 are exposed on an end face of the anode plate 31 that makes contact with the second insulating part 25B, the material constituting the second insulating part 25B penetrates into void holes in the porous layer 34. This leads to reduced risk of delamination caused by the presence of void holes in the porous layer 34, while allowing for improved mechanical strength of the porous layer 34.

In a preferred embodiment, the second insulating part 25B has a thermal expansion coefficient greater than the thermal expansion coefficient of the second through-hole conductor 64. More specifically, in a preferred embodiment, the material constituting the second insulating part 25B has a thermal expansion coefficient greater than the thermal expansion coefficient of the material (e.g., copper) constituting the second through-hole conductor 64. In this case, the second insulating part 25B, more specifically, the material constituting the second insulating part 25B presses on the porous layer 34 and the second through-hole conductor 64 upon expanding under high temperature environment. This sufficiently reduces the risk of delamination.

Alternatively, the thermal expansion coefficient of the second insulating part 25B may be equal to the thermal expansion coefficient of the second through-hole conductor 64, or may be less than the thermal expansion coefficient of the second through-hole conductor 64. More specifically, the thermal expansion coefficient of the material constituting the second insulating part 25B may be equal to the thermal expansion coefficient of the material constituting the second through-hole conductor 64, or may be less than the thermal expansion coefficient of the material constituting the second through-hole conductor 64.

The capacitor according to the present invention is used in, for example, a composite electronic component. Such a composite electronic component includes, for example, the capacitor according to the present invention, an outer electrode, and an electronic component. The outer electrode is disposed outside the capacitor according to the present invention, and electrically connected to each of the anode plate and the cathode layer. The electronic component is electrically connected to the outer electrode.

In the composite electronic component, the electronic component electrically connected to the outer electrode may be a passive element, may be an active element, may be each of a passive element and an active element, or may be a composite of a passive element and an active element.

Examples of the passive element include an inductor.

Examples of the active element include a memory, a graphical processing unit (GPU), a central processing unit (CPU), a micro processing unit (MPU), and a power management IC (PMIC).

If the capacitor according to the present invention is used in such a composite electronic component, the capacitor according to the present invention is handled as, for example, a substrate to which the electronic component is to be mounted as described above. Accordingly, by forming the capacitor according to the present invention in sheet form as a whole, and further forming the electronic component, which is to be mounted to the capacitor according to the present invention, in sheet form, the capacitor according to the present invention and the electronic component can be electrically connected to each other in the thickness direction via a through-hole conductor that extends through the electronic component in the thickness direction. As a result, the active element and the passive element each serving as the electronic component can be constructed as if these elements constitute a unified module.

For example, a switching regulator can be formed by electrically connecting the capacitor according to the present invention between a voltage regulator including a semiconductor active element, and a load that receives supply of a converted direct-current voltage.

The composite electronic component may be configured such that: a circuit layer is formed on one major face of a capacitor matrix sheet, which is a sheet where a plurality of the capacitors according to the present invention are laid out, and then the circuit layer is electrically connected to the passive element or the active element that serves as the electronic component.

The capacitor according to the present invention may be disposed in a cavity that is formed in a substrate in advance, and after filling the cavity with resin, a circuit layer may be formed on the resin. A passive component or active component that serves as another electronic component may be mounted in another cavity provided in the same substrate.

In an alternative possible configuration, the capacitor according to the present invention is mounted on a smooth carrier such as a wafer or glass, and after an outer layer part made of resin is formed, a circuit layer is formed, and then the circuit layer is electrically connected to the passive element or the active element that serves as the electronic component.

REFERENCE SIGNS LIST 1 capacitor array
10 capacitor layer
20, 40 conductive part
25 insulating part
25A first insulating part
25B second insulating part
29A first resin-filled part
29B second first resin-filled part
30 capacitor part

20

31 anode plate
32 core part
34 porous layer
34A first void
34B second void
34C insulating material
34V void hole
35 dielectric layer
36 cathode layer
36A solid electrolyte layer
36B conductor layer
42 via-conductor
60 through-hole conductor
62 first through-hole conductor
63 first through-hole
64 second through-hole conductor
65 second through-hole
68 anode connection layer
68A first anode connection layer
68B second anode connection layer
E1 outer end of insulating region near first through-hole conductor
E2 outer end of porous layer near first through-hole conductor
E3 outer end of insulating region opposite from first through-hole conductor
P1 position spaced apart in plane direction, by distance equal to thickness of porous layer, from outer end of porous layer near first through-hole conductor
P2 position spaced apart in plane direction toward first through-hole conductor, by distance equal to thickness of porous layer, from outer end of insulating region opposite from first through-hole conductor
R1 first region
R2 second region
T thickness direction
U plane direction

The invention claimed is:

1. A capacitor comprising:
a capacitor layer including a capacitor part, the capacitor part having a first through-hole extending through the capacitor part in the thickness direction and defining an inner wall surface, wherein the capacitor part includes:
an anode plate including a core part and a porous layer on at least one major face of the core part, the porous layer including a first void,
a dielectric layer on a surface of the porous layer, and
a cathode layer on a surface of the dielectric layer; and
a first through-hole conductor disposed at least on the inner wall surface of the first through-hole, wherein the first through-hole conductor is electrically connected to an end face of the anode plate that faces the inner wall surface of the first through-hole in a plane direction, the plane direction being a direction of a plane perpendicular to the thickness direction, and the first void contains at least part of the first through-hole conductor.

2. The capacitor according to claim 1, wherein the first void is located at an end face of the porous layer that defines the end face of the anode plate.

3. The capacitor according to claim 2,
wherein the porous layer includes a second void,
wherein the second void contains an insulating material,
wherein the porous layer includes an insulating region where the insulating material contained in the second void exists, and
wherein, in the plane direction, an outer end of the insulating region closest to the first through-hole conductor is farther away from the first through-hole conductor than an outer end of the porous layer closest to the first through-hole conductor.

4. The capacitor according to claim 3,
wherein the porous layer includes a first region spanning from the outer end of the porous layer closest to the first through-hole conductor to a position spaced apart in the plane direction by a distance equal to a thickness of the porous layer, and
wherein a void area fraction in the first region is greater than or equal to 0 area % and less than or equal to 30 area %.

5. The capacitor according to claim 4,
wherein the porous layer includes a second region spanning from an outer end of the insulating region opposite from the first through-hole conductor to a position spaced apart in the plane direction toward the first through-hole conductor by the distance equal to the thickness of the porous layer, and
wherein a void area fraction in the second region is greater than the void area fraction in the first region.

6. The capacitor according to claim 1,
wherein the porous layer includes a second void,
wherein the second void contains an insulating material,
wherein the porous layer includes an insulating region where the insulating material contained in the second void exists, and
wherein, in the plane direction, an outer end of the insulating region closest to the first through-hole conductor is farther away from the first through-hole conductor than an outer end of the porous layer closest to the first through-hole conductor.

7. The capacitor according to claim 6,
wherein the porous layer includes a first region spanning from the outer end of the porous layer closest to the first through-hole conductor to a position spaced apart in the plane direction by a distance equal to a thickness of the porous layer, and
wherein a void area fraction in the first region is greater than or equal to 0 area % and less than or equal to 30 area %.

8. The capacitor according to claim 7,
wherein the porous layer includes a second region spanning from an outer end of the insulating region opposite from the first through-hole conductor to a position spaced apart in the plane direction toward the first through-hole conductor by the distance equal to the thickness of the porous layer, and
wherein a void area fraction in the second region is greater than the void area fraction in the first region.

9. The capacitor according to claim 1,
wherein the first through-hole conductor includes an anode connection layer at the end face of the anode plate, and
wherein the anode connection layer is in contact with the end face of the anode plate.

10. The capacitor according to claim 9, wherein the anode connection layer includes:
a first anode connection layer in contact with the end face of the anode plate; and
a second anode connection layer on a surface of the first anode connection layer.

11. The capacitor according to claim 9, wherein, in the thickness direction, the anode connection layer has a dimension greater than a dimension of the anode plate.

12. The capacitor according to claim 1, wherein, when viewed in the thickness direction, the first through-hole conductor is electrically connected to the end face of the anode plate across an entire circumference of the first through-hole.

13. The capacitor according to claim 1, further comprising:
a second through-hole conductor disposed at least on an inner wall surface of a second through-hole, the second through-hole extending in the thickness direction through the capacitor part having the first through-hole conductor, and
wherein the second through-hole conductor is electrically connected to the cathode layer.

14. The capacitor according to claim 13, wherein the capacitor layer further includes:
a first insulating part on a surface of the capacitor part; and
a second insulating part on a surface of the first insulating part,
wherein the second insulating part extends between the anode plate and the second through-hole conductor.

* * * * *